United States Patent [19]

Sugama

[11] Patent Number: 4,822,422
[45] Date of Patent: Apr. 18, 1989

[54] CA(OH)$_2$-TREATED CERAMIC MICROSPHERE

[75] Inventor: Toshifumi Sugama, Mastic Beach, N.Y.

[73] Assignee: Associated Universities, Inc., Washington, D.C.

[21] Appl. No.: 106,269

[22] Filed: Oct. 9, 1987

[51] Int. Cl.$^4$ .................. C04B 7/00; C04B 14/00
[52] U.S. Cl. ............................. 106/97; 106/98
[58] Field of Search ............... 501/33; 106/98, 99, 106/97; 166/280

[56] References Cited

U.S. PATENT DOCUMENTS 4,504,320  3/1985  Rizer et al. ........................ 106/99
4,689,084  8/1987  Ambroise et al. ................. 106/99

OTHER PUBLICATIONS

Grant et al., *Chemical Dictionary*, McGraw Hill (NY) (1969), p. 572.

Primary Examiner—William R. Dixon, Jr.
Assistant Examiner—Andrew Griffis
Attorney, Agent, or Firm—Margaret C. Bogosian

[57] ABSTRACT

Geothermal wells with lost circulation problems are treated with a lightweight, high temperature (i.e. 350° C.) cement slurry which incorporates pressure resistant hollow microspheres into the slurry wherein the spheres have been pretreated with an alkali compound such as Ca(OH)$_2$ for up to 20 hours and at 100°–300° C. Preferably, the alkali solution is a saturated aqueous solution and the treatment is for 10 hours.

1 Claim, 1 Drawing Sheet

CA(OH)₂-TREATED CERAMIC MICROSPHERE

This invention was made with Government support under Contract Number DE-AC02-76CH00016 awarded by the Department of Energy. The Government has certain rights in this invention.

BACKGROUND

The use of normal-density 14 to 15.8 lb/gal (1.7 to 1.9 g/cc) cementing slurries in completing geothermal and oil wells frequently results in problems of lost circulation when attempts are made to cement well regions that pass through weak unconsolidated rock zones having very fragile gradients. Specifically, these unconsolidated formations fracture as a result of the high hydrostatic pressures required to pump the highly dense cement slurries. To avoid this problem, high-temperature low-density cement slurries are needed to support the intermediate casing pipe and to protect the casing from corrosive fluids and gases.

One method for the preparation of lightweight cement slurries which can be used in geothermal and oil wells is to incorporate pressure-resistant hollow microspheres into cement slurries [Martin, Proceedings of the Third International Seminar of EC Geothermal Energy Research, Munich, Germany, p. 447, (1983)]. In addition to producing a lighweight slurry, the relatively high bridging ability of the hollow beads enhances its effectiveness in controlling lost-circulation problems.

However, experience with microsphere-filled lightweight cement systems suggests that the inclusion of the microspheres as a filler is not sufficient to yield the properties needed for geothermal cements. For instance, when a slurry with a density of 1.16 g/cc is autoclaved for 24 hours at a temperature of 300° C. and a hydrostatic pressure of 1500 psi (10.3 MPa), the compressive strength of the set cement paste is only 610 psi (4.2 MPa). The low strength is presumed to be due to poor bonding at the cement-microsphere interface, and a low degree of hydration in the cement matrixes and the interfacial regions. Therefore, modification of the microsphere surfaces was necessary to produce a high-quality high temperature lightweight cementing material that could meet the criteria established for geothermal cements. The most important of these criteria are a slurry density of <1.2 g/cc at 25° C., a 300° C.-24 hour compressive strength of >1000 psi (6.9 MPa), and a bulk density of <1.0 g/cc.

BRIEF DESCRIPTION OF THE INVENTION

The present invention relates to surface preparation techniques for the pressure-resistant ceramic hollow microspheres used as fillers in geothermal cements which render the microspheres reliable in developing the desired high strength of the geothermal and oil well cementing materials at a temperature of up to 350° C.

The lightweight filler used in this invention is a pressure-resistant ceramic hollow microsphere, having an average particle size of approximately 125 μm and a bulk density of approximately 0.4 g/cc. The surface modification of the microspheres is accomplished as follows: The microsphere surfaces are first rinsed with deionized water to remove any contamination and then exposed for up to 20 hours to a saturated solution of an alkali earth metal hydroxide, preferably Ca(OH)₂, at a high temperature between 100° and 300° C. The preferred treatment regimen is 100° C. for 10 hours. The microspheres are then washed again in deionized water and subsequently dried in an oven at temperatures around 110° C.

API class H cement was used as the matrix since it has good strength chracteristics at bottom-hole static temperatures >110° C. Table 1 below shows the composition of a lightweight cement composite containing the surface-treated microsphere of the present invention. Typical chemical analysis of the class H cement, supplied by the Lehigh Portland Cement Company, that was used in preparing the geothermal cements using the treated microspheres of the present invention is given in Table 2.

TABLE 1

| | Composition | | |
|---|---|---|---|
| Class H Cement, (C) wt % | Silica, flour (S) wt % | Water, (W) wt % | Microsphere wt % |
| 30 | 10 | 35 | 25 |

TABLE 2

| | Composition, wt % | | | | | |
|---|---|---|---|---|---|---|
| | SiO₂ | CaO | Al₂O₃ | Fe₂O₃ | MgO | SO₃ | Loss on Ignition |
| Class H | 22.40 | 64.40 | 4.29 | 4.92 | 0.80 | 2.20 | 0.40 |

DETAILED DESCRIPTION OF THE INVENTION

Figure 1:
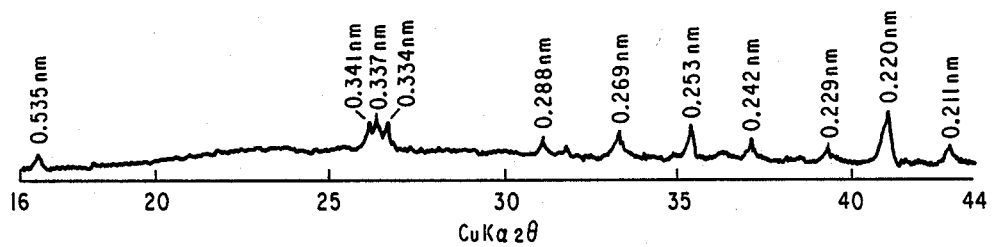
FIG. 1 shows an x-ray powder diffraction (XRD) pattern of shell material in "as-received" hollow microspheres.

The compressive strength and water permeability of high temperature lightweight cementing materials containing pressure resistant sillimanite-based hollow microspheres as a filler can be improved by treating the surfaces of the microspheres with a Ca(OH)₂ solution at elevated temperatures in the range of from 100° C. to 300° C. Analysis of the chemical constituents of the preferred sillimanite-based microspheres by x-ray powder diffraction analysis (XRD) showed the presence of sillimanite, [represented interchangeably as Al(AlSiO₅) and Al₂SiO₅], and quartz, so that the shell structure of the hollow microspheres appears to be an assembly of hybrid phases of sillimanite and silica glass. FIG. 1 shows the XRD pattern of the untreated microsphere shell. The treated surface of the sillimanite-based sphere plays an essential role in developing favorable bonding characteristics at the interfaces and in promoting the hydration of the cement matrix. Bonding is associated with the formation of an intermediate layer of aluminum-rich calcium silicate hydrate, produced by an interfacial reaction of the cement paste with the epitaxy, under the hydrothermal environment at temperatures around 300° C. A dense intermediate layer consisting of a rim structure of approximately 4 μm thickness acts in cross-linking and coupling functions that serve to connect the cement matrix and spheres, thereby improving the interfacial bond strength. The presence of the epitaxial layer on the treated sphere surfaces leads to the formation of a well-crystallized tobermorite matrix phase, which is responsible for the development of strength in the lightweight cements incorporating the treated microspheres.

The following empirical evidence is drawn for the interaction at the interface between the sphere surface and the $Ca(OH)_2$ solution, and for the formation of its reaction products at the interface. When the sillimanite-based microspheres are exposed to the alkaline $Ca(OH)_2$-saturated solution at 100° C., more silicate and aluminate is dissolved from the sphere surface as an essential first step in the chemical reaction. This dissolution significantly promotes the precipitation of epitaxial $CaO$—$SiO_2$—$H_2O$ and $CaO$—$Al_2O_3$—$SiO_2$—$H_2O$ formations, produced by the chemical reactions between the dissociated Si and Al with the abundant Ca ions released from the $Ca(OH)_2$ solution. With increased hydration, the precipitated layer is overlapped by these epitaxial hydration products. While the epitaxies grow in vicinity of the sphere surface, the unreactive $Ca(OH)_2$ also precipitates in the contact layer formed at the interfacial regions between the spheres and the reaction products. However, the deposited $Ca(OH)_2$ is masked entirely within the hydrated reaction product layers. Finally, the continuous contact layer forms a spherical shell structure to fully encapsulate the sphere.

EXAMPLE

The lightweight filler used was pressure-resistant, sillimanite-based hollow microspheres having an average particle size of approximately 125 $\mu$m and a bulk density of 0.4 g/cc, supplied by Fillite U.S.A., Inc. The microspheres ranged in size from approximately 30 to approximately 200 $\mu$m, and it was estimated from profiles of fragments from fractured spheres that the wall thickness was approximately 10 $\mu$m. An API class H cement, supplied by the Lehigh Portland Cement Co., was used as the matrix. A typical analysis of the cement was: 64.4 wt% CaO, 22.4 wt% $SiO_2$, 4.29 wt% $Al_2O_3$, 4.29 wt% $Fe_2O_3$, 0.8 wt% MgO, and 2.2 wt% $SO_3$. To prevent retrogression of strength at high temperatures, silica flour having a particle size of <44 $\mu$m was added to the cement.

The surface modification of the microspheres was accomplished as follows. The microsphere surfaces first were rinsed with deionized water to remove any contamination and then exposed for approximately 20 hours in a saturated solution of $Ca(OH)_2$ at a temperature of up to 300° C. Then the microspheres were again washed in deionized water and subsequently dried in an oven at 110° C. Microspheres treated with only the deionized water at temperatures of up to 300° C. were employed as controls.

Microsphere-filled lightweight cements, used to determine compressive strength and water permeability, and to explore cement-microsphere interfaces, were prepared the following way. The lightweight cement slurries, consisting of 30 wt% class H cement, 10 wt% silica flour, 25 wt% microspheres [$Ca(OH)_2$ treated for the cements of the present invention and deionized water treated for the controls], and 35 wt% water were poured into glass test tubes, 3.5-cm diam. by 7.0-cm long. The test tubes were then autoclaved for 24 hours at 300° C.

The chemical states and elemental compositions at the surface sites of treated and untreated microspheres were identified by precise determinations of bonding energies and peak intensities with x-ray photoelectron spectroscopy (XPS). The spectrometer used was a V.G. Scientific ESCA 3 MK II: the exciting radiation was provided by a magnesium K alpha x-ray source, operated at a constant power of 200 W (10 kV, 20 mA). The vacuum in the analyzer chamber of the instrument was maintained at $10^{-9}$ Torr.

The morphological and chemical aspects of the surface and subsurface of treated microspheres, and the cement hydration products formed in the cement-sphere contact zone were examined with an AMR 100-Å scanning electron microscope (SEM) associated with TN-2000 energy-dispersive x-ray spectrometry (EDX).

SEM and EDX studies of the surface of the untreated microspheres showed the surface morphology to be relatively smooth suggesting that they are mostly free of irregularities or deposits. EDX analysis indicates that the predominant element present is silicon, with lesser amounts of aluminum, potassium, and iron and a small quantity of titanium.

Figure 2:
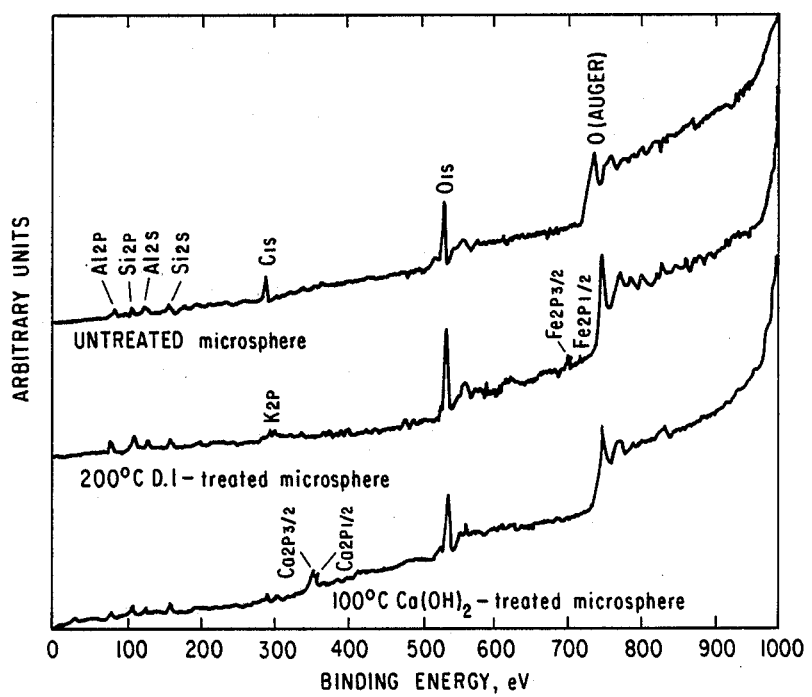
FIG. 2 shows an x-ray photoelectron spectroscopy (XPS) survey-scan spectra for untreated, 200° C. deionized water-treated, and 100° C. Ca(OH)₂-treated spheres.

FIG. 2 is the XPS spectrum for the unmodified sphere surfaces and it shows the presence of an intense $O_{1s}$ peak and a secondary strong carbon ($C_{1s}$) peak. The latter is mainly ascribed to the residual carbon contaminants. Small aluminum ($Al_{2p}$ and $Al_{2s}$) and silicon ($Si_{2p}$ and $Si_{2s}$) signals also were identified. However, the signal intensities of K, Ti, and Fe which were clear on the EDX analysis are too weak to be detected on the wide scan at the maximum count rate of 10800 C.P.S. Thus, the unmodified sphere surfaces appear to be overlaid with a thin film consisting of oxidized aluminum, silica glass, and a carbon contaminant. All of the K, Ti, and Fe seem to exist at the subsurfaces. Such thin surface films are removable.

EDX analysis of the microsphere surface after washing with deionized water showed that the originally smooth surface of the "as-received" spheres was transformed into a geometrically reticulated network by washing at 200° C. This morphological transformation reveals the characteristics of the underlying structure and indicates that the thin overlay can be removed by hot deionized water. The typical network structure of lath-like crystals in the underlying material beneath the thin film must be associated with the formation of sillimanite, $Al(AlSiO_5)$, as the major phase of the shell structure. The EDX data suggests that the underlying crystalline materials contain a large amount of silicon compounds. No significant changes in peak intensity were observed for elements such as Al, K, Ti, and Fe.

Compared with the untreated surface, the scan in FIG. 2 (an XPS wide scan for the 200° C. deionized water-treated sphere surface) is characterized by intense Al, Si, and O signals, the appearance of identical K and Fe peaks, and a considerable reduction in C peak intensity. The probable reason for the latter is the elimination of carbon contamination by the hot deionized water treatment.

Of particular interest were the morphological transformations which occurred on the sphere surfaces modified by the $Ca(OH)_2$-saturated solution at 100° C. The SEM image exhibited a morphologically peculiar surface that consisted of a layer of elongated crystals, providing evidence of epitaxial growth of certain hydration products. The epitaxy was topographically identical to the formation of a continuous layer overlaid on the sphere surface. The continuous epitaxy film formed a shell structure that encapsulated the sphere particle. The EDX spectrum for this hydration shell revealed noteworthy reductions in the intensities of the Si, K, Ti, and Fe peaks, a Ca signal, and an unchanged Al peak. The presence of the Ca peak related directly to the reaction products at the interface between the Ca(OH)$_2$ and the chemical composites of the sphere surface, and the Ca(OH)$_2$ precipitates on the sphere. The reduction in the peaks for Si, K, Ti, and Fe elements indicated that the sphere was covered by calcium hydration products to a depth of at least 1 μm. The essentially constant Al intensity for both the Ca(OH)$_2$- and the deionized water treated spheres verified that a relatively large amount of Al was present in the epitaxy layers.

Table 3 summarizes the slurry density measurements, and the densities, compressive strengths, and water permeabilities of the cured specimens. Each value represents the average of three measurements. As expected, the control specimens had a low compressive strength (600 psi) (4.2 MPa). This was greatly improved by treatment of the spheres with either deionized water alone or deionized water followed by Ca(OH)$_2$. The strength of the specimens made with deionized water-treated spheres appears to depend on the temperature of the treatment. For example, the strength developed in the 100° C. deionized water-treated specimens was considerably lower than those at 200° and 300° C. This reduced level of improvement might be associated with the presence of a larger amount of a carbon contaminant on the sphere surface, suggesting that such a contaminant cannot be removed by deionized water at 100° C. The strengths for the Ca(OH)$_2$ sphere-filled specimens appear to be less dependent on the temperature of the treatment. Here, a maximum strength of 1440 psi (9.92 MPa) was obtained for the 200° C. Ca(OH)$_2$-treated specimens. This value corresponds to an improvement in strength of approximately 2.4 times above the untreated controls and 1.3 times greater than the 300° C. deionized water-treated specimens. It should also be noted that the incorporation of spheres treated with the Ca(OH)$_2$ solution at the high temperature of 300° C. results in a reduction in strength. Therefore, a temperature of up to 200° C. is preferable. As expected, an increase in compressive strength results in a reduction in water permeability. Notably, the water permeability value for the 200° C. Ca(OH)$_2$-treated sphere specimens was two orders of magnitude less than that for the untreated specimens.

TABLE 3

Properties of Untreated and Treated Sphere-Filled Lightweight Cementing Materials.

| Treatment of microspheres | Slurry density, g/cc | 300° C.-24 hr autoclaved specimen | | |
|---|---|---|---|---|
| | | Density of set cement, g/cc | Compressive strength, MPa (psi) | Water permeability, darcy |
| Untreated | 1.16 | 0.90 | 4.20 (610) | 7.86 × 10$^{-4}$ |
| 100° C. deionized water-treated | 1.16 | 0.90 | 4.44 (644) | — |
| 200° C. deionized water-treated | 1.17 | 0.91 | 7.44 (1080) | 2.48 × 10$^{-5}$ |
| 300° C. deionized water-treated | 1.19 | 0.92 | 7.79 (1130) | — |
| 100° Ca(OH)$_2$-treated | 1.17 | 0.91 | 9.51 (1380) | — |
| 200° Ca(OH)$_2$-treated | 1.19 | 0.91 | 9.92 (1440) | 5.63 × 10$^{-6}$ |
| 300° Ca(OH)$_2$-treated | 1.20 | 0.95 | 8.68 (1260) | — |

I claim:

1. A lightweight cement slurry composed of:

| | Weight percent |
|---|---|
| Class H Cement (C) | 30 |
| Silica flour (S) | 10 |
| Water | 35 |
| Pressure resistant sillimanite-based microspheres treated before inclusion in the slurry by washing and exposing to a solution of an alkali earth metal hydroxide at an elevated temperature for a period up to twenty hours | 25 |

* * * * *